US009328783B2

(12) United States Patent
Tamaru

(10) Patent No.: US 9,328,783 B2
(45) Date of Patent: *May 3, 2016

(54) VEHICLE DRIVING DEVICE

(71) Applicant: AISIN SEIKI KABUSHIKI KAISHA, Kariya-shi (JP)

(72) Inventor: Daisuke Tamaru, Tokai (JP)

(73) Assignee: AISIN SEIKI KABUSHIKI KAISHA, Kariya-Shi, Aichi-Ken (JP)

( * ) Notice: Subject to any disclaimer, the term of this patent is extended or adjusted under 35 U.S.C. 154(b) by 6 days.

This patent is subject to a terminal disclaimer.

(21) Appl. No.: 14/285,235

(22) Filed: May 22, 2014

(65) Prior Publication Data

US 2014/0350809 A1    Nov. 27, 2014

(30) Foreign Application Priority Data

May 27, 2013   (JP) ................................. 2013-111121

(51) Int. Cl.
| | |
|---|---|
| *B60W 10/02* | (2006.01) |
| *F16D 48/06* | (2006.01) |
| *B60T 7/22* | (2006.01) |

(Continued)

(52) U.S. Cl.
CPC . *F16D 48/06* (2013.01); *B60T 7/22* (2013.01); *B60W 10/02* (2013.01); *B60W 10/06* (2013.01); *B60W 10/184* (2013.01); *B60W 30/09* (2013.01); *B60W 30/18136* (2013.01); *B60W 50/14* (2013.01); *F02D 41/022* (2013.01); *F02D 41/0215* (2013.01); *F02D 41/12* (2013.01); *F02D 41/123* (2013.01); *B60T 2201/022* (2013.01); *B60W 2510/0208* (2013.01); *B60W 2510/101* (2013.01); *B60W 2520/10* (2013.01); *B60W 2550/10* (2013.01); *B60W 2710/027* (2013.01); *B60W 2710/0627* (2013.01); *B60W 2710/0666* (2013.01); *F02D 2200/70* (2013.01);

(Continued)

(58) Field of Classification Search
None
See application file for complete search history.

(56) References Cited

U.S. PATENT DOCUMENTS

2008/0215220 A1 *   9/2008   Winkel et al. ................... 701/68
2011/0015818 A1     1/2011   Breuer et al.

(Continued)

FOREIGN PATENT DOCUMENTS

| DE | 10 2008 003 205 A1 | 7/2009 |
|---|---|---|
| DE | 10 2010 003 677 A1 | 10/2011 |

(Continued)

OTHER PUBLICATIONS

The extended European Search Report issued on Nov. 24, 2014, by the European Patent Office in corresponding European Patent Application No. 14168783.0. (7 pages).

*Primary Examiner* — Justin Holmes
(74) *Attorney, Agent, or Firm* — Buchanan Ingersoll & Rooney PC

(57) ABSTRACT

A vehicle driving device includes: a clutch that is provided between a driving shaft of an engine and an input shaft of a manual transmission and that connects the driving shaft and the input shaft to each other or disconnects the driving shaft and the input shaft from each other; a clutch torque changing unit that changes clutch torque between the driving shaft and the input shaft; a collision possibility determination unit that determines a possibility of collision between an obstacle and a host vehicle; and a collision avoidance unit that gives an instruction to the clutch torque changing unit so as to avoid collision with the obstacle when the collision possibility determination unit determines that there is a possibility of collision with the obstacle.

7 Claims, 8 Drawing Sheets

(51) Int. Cl.
  *B60W 10/06* (2006.01)
  *B60W 10/184* (2012.01)
  *B60W 30/09* (2012.01)
  *F02D 41/02* (2006.01)
  *F02D 41/12* (2006.01)
  *B60W 50/14* (2012.01)
  *B60W 30/18* (2012.01)

(52) U.S. Cl.
  CPC ... *F02D 2200/701* (2013.01); *F16D 2500/3128* (2013.01)

(56) References Cited

U.S. PATENT DOCUMENTS

2013/0226420 A1* 8/2013 Pedlar et al. .................... 701/67
2014/0095038 A1 4/2014 Breu et al.
2014/0350811 A1* 11/2014 Tamaru ........................... 701/68

FOREIGN PATENT DOCUMENTS

| DE | 10 2011 102 330 A1 | 11/2012 |
| FR | 2 796 601 A1 | 1/2001 |
| JP | 11-321389 A | 11/1999 |

* cited by examiner

VEHICLE DRIVING DEVICE

CROSS REFERENCE TO RELATED APPLICATIONS

This application is based on and claims priority under 35 U.S.C. §119 to Japanese Patent Application 2013-111121, filed on May 27, 2013, the entire contents of which are incorporated herein by reference.

TECHNICAL FIELD

This disclosure relates to a vehicle driving device for manual transmission having an anti-collision function.

BACKGROUND DISCUSSION

JP 11-321389 (Reference 1) discloses an anti-collision technique for shifting an automatic transmission to reduce the driving force transmitted to the driving wheels when a distance between a host vehicle, in which the automatic transmission is mounted, and an obstacle in front is smaller than the safety distance when the host vehicle is accelerating.

In a vehicle including a manual transmission, the anti-collision technique disclosed in JP 11-321389A (Reference 2) cannot be applied since a driver selects a gear.

SUMMARY

Thus, a need exists for a vehicle driving device for manual transmission which is not suspectable to the drawback mentioned above.

A first aspect of this disclosure is directed to a vehicle driving device including: a clutch that is provided between a driving shaft of an engine and an input shaft of a manual transmission and that connects the driving shaft and the input shaft to each other or disconnects the driving shaft and the input shaft from each other; a clutch torque changing unit that changes clutch torque between the driving shaft and the input shaft; a collision possibility determination unit that determines a possibility of collision between an obstacle and a host vehicle; and a collision avoidance unit that gives an instruction to the clutch torque changing unit so as to avoid collision with the obstacle when the collision possibility determination unit determines that there is a possibility of collision with the obstacle.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

Description of a Vehicle

Figure 1:
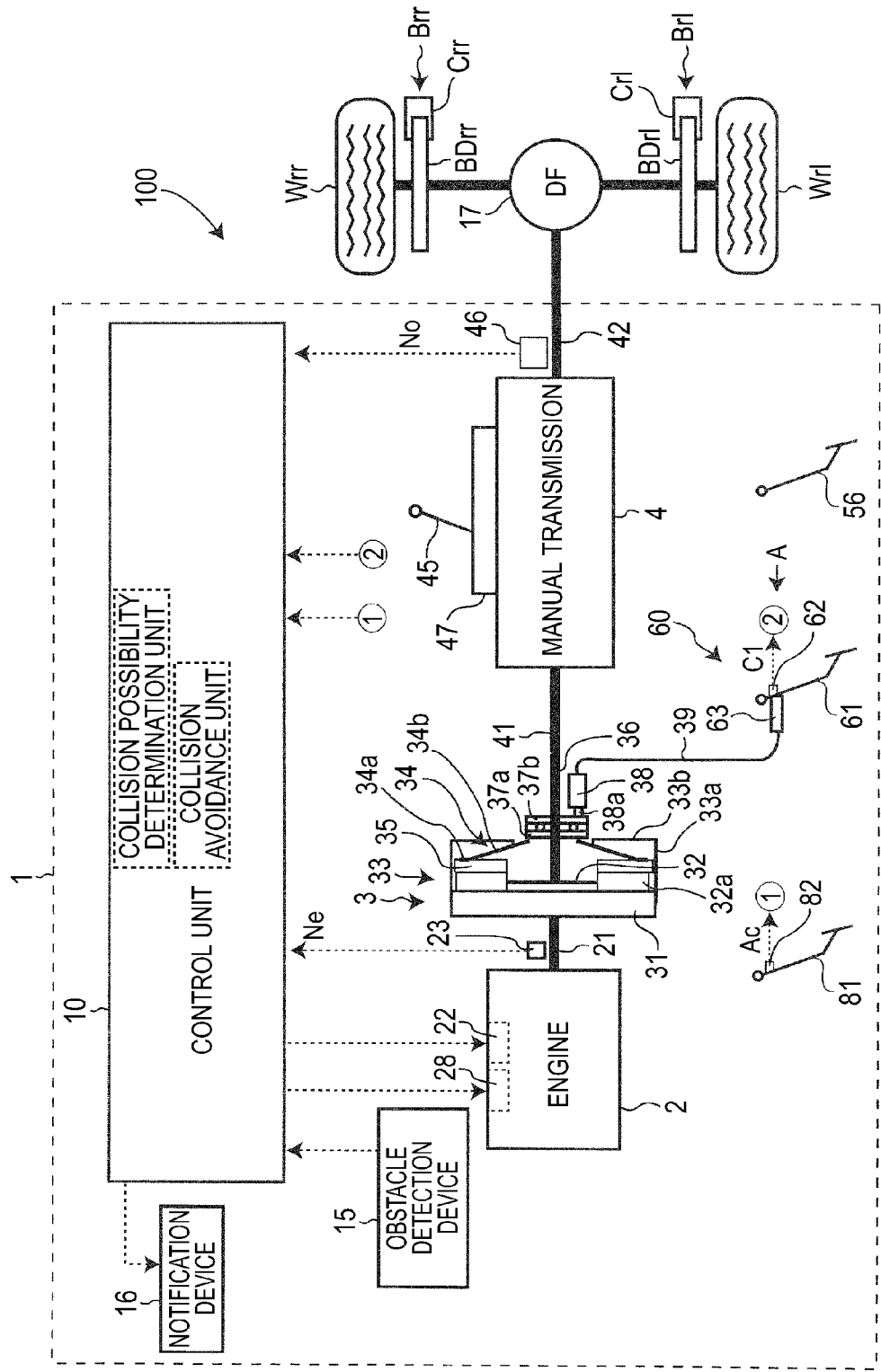
FIG. 1 is a block diagram showing the configuration of a vehicle driving device of the present embodiment.

A vehicle driving device 1 will be described with reference to FIG. 1. FIG. 1 schematically shows the vehicle driving device 1 of a vehicle 100 including an engine 2. In FIG. 1, a thick line shows a mechanical connection between devices, and the arrow by the dotted line shows a signal line for control.

As shown in FIG. 1, in the vehicle 100, the engine 2, a clutch 3, a manual transmission 4, and a differential device 17 are disposed in series in this order. Driving wheels Wrr and Ml of the vehicle 100 are connected to the differential device 17.

The vehicle 100 includes an accelerator pedal 81 and a clutch pedal 61. The accelerator pedal 81 is for variably operating engine torque Te output from the engine 2. An accelerator sensor 82 that detects an accelerator opening Ac, which is the operation amount of the accelerator pedal 81, is provided in the accelerator pedal 81.

The clutch pedal 61 (clutch operation unit) is for operating the clutch 3 by changing clutch torque Tc to be described later. The vehicle 100 includes a master cylinder 63 that generates a hydraulic pressure corresponding to the operation amount of the clutch pedal 61. A clutch sensor 62 that detects the stroke of the master cylinder 63, that is, the operation amount (hereinafter, appropriately referred to as a clutch stroke Cl) of the clutch pedal 61 is provided in the master cylinder 63.

The engine 2 is a gasoline engine, a diesel engine, or the like that uses a hydrocarbon fuel, such as gasoline or diesel. The engine 2 includes a driving shaft 21, a throttle valve 22, an engine rotation speed sensor 23, and a fuel injection device 28. The driving shaft 21 rotates integrally with a crankshaft that is driven to rotate by a piston. Thus, the engine 2 outputs the engine torque Te to the driving shaft 21 to drive the driving wheels Wrr and Wrl. When the engine 2 is a gasoline engine, an ignition device (not shown) for igniting the air-fuel mixture in the cylinder is provided in the cylinder head of the engine 2.

The throttle valve 22 is provided in the middle of the path to take air into the cylinder of the engine 2. The throttle valve 22 is for adjusting the amount of air (amount of air-fuel mixture) taken into the cylinder of the engine 2. The fuel injection device 28 is provided in the middle of the path to take air into the cylinder of the engine 2 or in the cylinder head of the engine 2. The fuel injection device 28 is a device for injecting fuel, such as gasoline or diesel.

The engine rotation speed sensor 23 is disposed at a position adjacent to the driving shaft 21. The engine rotation speed sensor 23 detects the engine rotation speed Ne, which is the rotation speed of the driving shaft 21, and outputs the detection signal to a control unit 10 as a collision possibility determination unit or a collision avoidance unit. In the present embodiment, the driving shaft 21 of the engine 2 is connected to a flywheel 31 that is an input member of the clutch 3 to be described later.

The clutch 3 is provided between the driving shaft 21 of the engine 2 and an input shaft 41 of the manual transmission 4 to be described later. The clutch 3 is a manual type clutch that connects the driving shaft 21 and the input shaft 41 to each other or disconnects the driving shaft 21 and the input shaft 41 from each other by the operation of the clutch pedal 61 by the driver and changes the clutch torque Tc (shown in FIG. 2) between the driving shaft 21 and the input shaft 41. The clutch 3 includes the flywheel 31, a clutch disc 32, a clutch cover 33, a diaphragm spring 34, a pressure plate 35, a clutch shaft 36, a release bearing 37, and a slave cylinder 38.

The flywheel 31 has a disk shape, and is connected to the driving shaft 21. The clutch shaft 36 is connected to the input shaft 41. The clutch disc 32 has a disk shape, and a friction material 32a is provided on both surfaces of the outer peripheral portion. The clutch disc 32 spline-fits to the tip of the clutch shaft 36 so as to face the flywheel 31 and so as to be axially movable and be not rotatable.

The clutch cover 33 is configured to include a cylindrical portion 33a having a flat cylindrical shape and a plate portion 33b extending in a rotation center direction from the end of the cylindrical portion 33a. The other end of the cylindrical portion 33a is connected to the flywheel 31. Accordingly, the clutch cover 33 rotates integrally with the flywheel 31. The pressure plate 35 has a disk shape with a hole opened at the center. The pressure plate 35 is axially movably disposed so as to face the clutch disc 32 on the opposite side of the flywheel 31. The clutch shaft 36 is inserted into the center of the pressure plate 35.

The diaphragm spring 34 is configured to include a ring portion 34a having a ring shape and a plurality of plate spring portions 34b extending inwardly from the inner periphery of the ring portion 34a. The plate spring portion 34b is inclined gradually toward the inside direction so as to be located on the plate portion 33b side. The plate spring portion 34b is elastically deformable in the axial direction. The diaphragm spring 34 is disposed between the pressure plate 35 and the plate portion 33b of the clutch cover 33 in a state where the plate spring portion 34b is compressed in the axial direction. The ring portion 34a is in contact with the pressure plate 35. An intermediate portion of the plate spring portion 34b is connected to the inner periphery of the plate portion 33b. The clutch shaft 36 is inserted into the center of the diaphragm spring 34.

The release bearing 37 is fixed to the housing of the clutch 3 (not shown). The clutch shaft 36 is inserted into the center of the release bearing 37, and is disposed so as to be axially movable. The release bearing is configured to include first and second members 37a and 37b that face each other and can rotate relative to each other. The first member 37a is in contact with the tip of the plate portion 33b.

The slave cylinder 38 includes a push rod 38a that moves back and forth by hydraulic pressure. The tip of the push rod 38a is in contact with the second member 37b of the release bearing 37. The slave cylinder 38 and the master cylinder 63 are connected to each other by a hydraulic pressure pipe 39.

In a state where the clutch pedal 61 is not stepped on, hydraulic pressure is generated in neither the master cylinder 63 nor the slave cylinder 38. In this state, the clutch disc 32 is pressed by being biased to the flywheel 31 by the diaphragm spring 34 through the pressure plate 35. Therefore, due to the frictional force between the friction material 32a and the flywheel 31 and the frictional force between the friction material 32a and the pressure plate 35, the flywheel 31, the clutch disc 32, and the pressure plate 35 rotate integrally, and the driving shaft 21 and the input shaft 41 rotate integrally.

On the other hand, when the clutch pedal 61 is stepped on, hydraulic pressure occurs in the master cylinder 63, and hydraulic pressure also occurs in the slave cylinder 38. Then, the push rod 38a of the slave cylinder 38 presses the release bearing 37 against the diaphragm spring 34 side. Then, the plate spring portion 34b is deformed with its connection portion, which is connected to the inner periphery of the plate portion 33b, as a support point, and the biasing force to bias the clutch disc 32 to the flywheel 31 is reduced and finally becomes 0.

Figure 2:
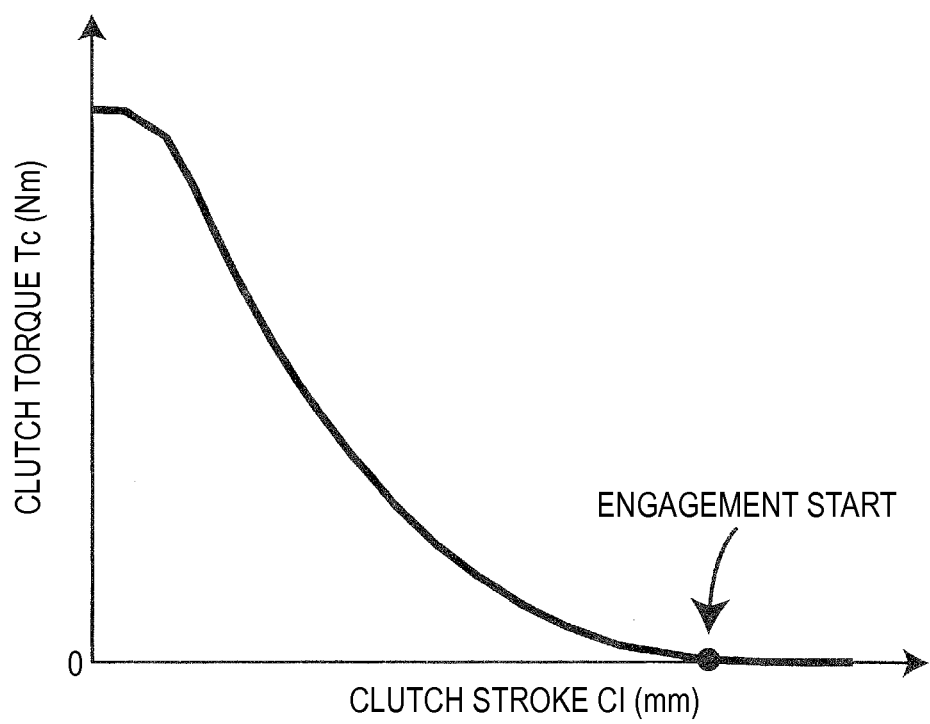
FIG. 2 is "clutch torque mapping data" showing the relationship between the clutch stroke and the clutch torque.

As shown in FIG. 2, as the clutch stroke Cl that is a stroke of the master cylinder 63 increases, the clutch torque Tc that the clutch 3 transmits from the driving shaft 21 to the input shaft 41 is reduced. When the biasing force becomes 0, the clutch torque Tc becomes 0, and the clutch 3 is completely disengaged. Thus, the clutch 3 of the present embodiment is a normally closed clutch that is in a connection state when the clutch pedal 61 is not stepped on.

In the following explanation, a state where the friction material 32a starts a contact with the flywheel 31 or the pressure plate 35 is referred to as an engagement start of the clutch 3. In addition, an abrupt increase in the clutch torque Tc is referred to as sudden engagement of the clutch 3.

The manual transmission 4 is provided between the driving shaft 21 and the driving wheels Wrr and Wrl. The manual transmission 4 includes the input shaft 41 and an output shaft 42. The input shaft 41 is connected to the clutch shaft 36 that is an output member of the clutch 3, and the engine torque Te from the engine 2 is input to the input shaft 41. The output shaft 42 is rotatably connected to the driving wheels Wrr and Wrl. The manual transmission 4 is a multi-stage transmission for selectively switching a plurality of gears of different gear ratios, which are obtained by dividing the input shaft rotation speed Ni (rotation speed of the input shaft 41) by the output shaft rotation speed No, between the input shaft 41 and the output shaft 42.

The manual transmission 4 includes a shift operation mechanism 47 that converts the operation of a shift lever 45 by the driver into the force to operate a selection mechanism. The driver can select the above-described gear by operating the shift lever 45, and can make the manual transmission 4 in a neutral state where the input shaft 41 and the output shaft 42 are not rotatably connected to each other.

An output shaft rotation speed sensor 46 that detects the rotation speed (output shaft rotation speed No) of the output shaft 42 is provided at a position adjacent to the output shaft 42. The output shaft rotation speed No detected by the output shaft rotation speed sensor 46 is output to the control unit 10.

The control unit 10 performs overall control of the vehicle 100. The control unit 10 includes a CPU, a RAM, a ROM, a storage unit formed of a nonvolatile memory, and the like (all of which are not shown). The CPU executes a program corresponding to the flowchart shown in FIG. 5. The RAM temporarily stores variables required to execute the program. The storage unit stores the program or mapping data shown in FIG. 2.

The control unit 10 calculates required engine torque Ter, which is the torque of the engine 2 that the driver requests, based on the accelerator opening Ac of the accelerator sensor 82 that is based on the operation of the accelerator pedal 81 by the driver. Then, based on the required engine torque Ter, the control unit 10 adjusts the opening S of the throttle valve 22 to adjust the amount of intake air, and adjusts the fuel injection amount of the fuel injection device 28 to control the ignition device.

As a result, since the amount of supply of the air-fuel mixture containing fuel is adjusted, the engine torque Te output from the engine 2 is adjusted to the required engine torque Ter, and the engine rotation speed Ne is adjusted.

The vehicle 100 includes an obstacle detection device 15. The obstacle detection device 15 is a device that detects an obstacle in front of the vehicle 100. For example, the obstacle detection device 15 is a stereo camera, a millimeter-wave radar, or an infrared laser radar. The obstacle detection device 15 is mounted in front of the driver's seat of the vehicle 100 or on a bumper of the vehicle 100 so as to face forward.

The control unit 10 (collision possibility determination unit) determines whether or not there is a possibility that the vehicle 100 will collide with an obstacle in front based on the detection information from the output shaft rotation speed sensor 46 and the obstacle detection device 15. Specifically, first, the control unit 10 calculates the speed of the vehicle 100 (hereinafter, abbreviated to host vehicle speed Vown) based on the detection signal from the output shaft rotation speed sensor 46. Then, the control unit 10 calculates a relative distance to the obstacle based on the detection information from the obstacle detection device 15.

Then, the control unit 10 determines whether or not there is a possibility that the vehicle 100 will collide with the obstacle based on the relative distance to the obstacle and the host vehicle speed Vown. The technique for determining whether or not there is a possibility that the vehicle 100 will collide with an obstacle is a known technique disclosed in detail in JP 11-321389A, JP 2006-168629A, and JP 2012-192776A. Accordingly, further explanation will be omitted herein.

The vehicle 100 includes a notification device 16, such as a speaker, a display, a warning lamp. The notification device 16 is communicably connected to the control unit 10.

Brake Unit

Figure 3:
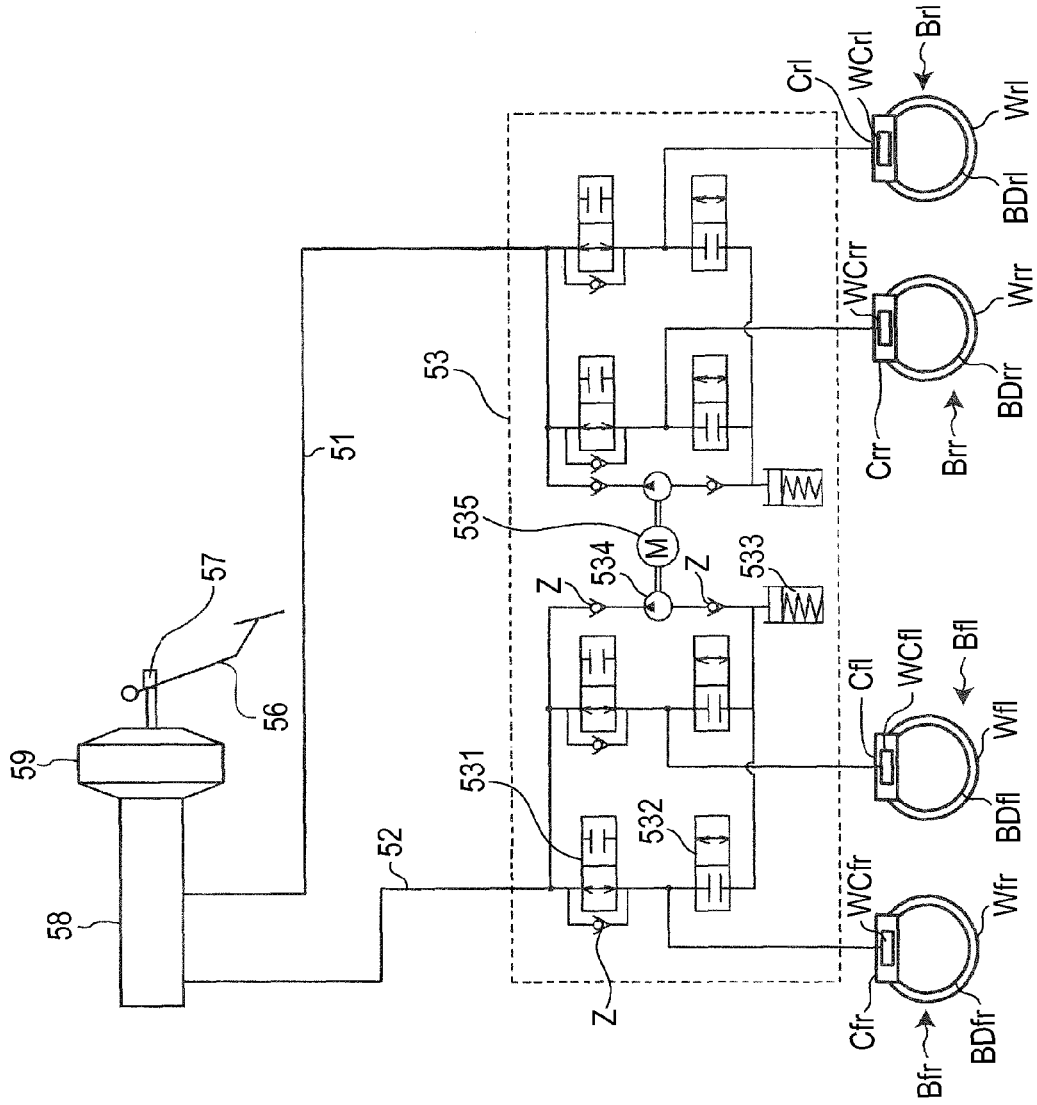
FIG. 3 is an explanatory diagram showing a brake unit, a master cylinder, a vacuum booster, and a pressure regulator.

As shown in FIG. 1 or 3, the vehicle includes brake units Bfl, Bfr, Brl, Brr, a brake pedal 56, a master cylinder 58, a vacuum booster 59, and a pressure regulator 53.

As shown in FIG. 3, the brake units Bfl, Bfr, Brl, and Brr include brake discs BDfl, BDfr, BDrl, and BDrr, which rotate integrally with wheels Wfl, Wfr, Wrl, and Wrr, and calipers Cfl, Cfr, Crl, and Crr, which generates friction braking force by pressing brake pads (not shown) against the brake discs BDfl, BDfr, BDrl, and BDrr, respectively. Wheel cylinders WCfl, WCfr, WCrl, and WCrr that press brake pads against brake discs DRfl, DRfr, DRrl, and DRrr with "master pressure" generated by the master cylinder 58 are provided in the brake units Bfl, Bfr, Brl, and Brr, respectively.

The master cylinder 58 is a device that generates "master pressure" by the operation force input to the brake pedal 56. The vacuum booster 59 is a device that is connected to an intake manifold of the engine 2 and that increases the operation force input to the brake pedal 56 with negative pressure supplied from the intake manifold and outputs the increased operation force to the master cylinder 58.

The pressure regulator 53 increases or decreases the "master pressure" of the brake fluid supplied from the master cylinder 58 and supplies "wheel cylinder pressure" to the wheel cylinders WCfl, WCfr, WCrl, and WCrr, thereby realizing well-known anti-lock brake control or antiskid control. The master cylinder 58 and the wheel cylinders WCrr and WCrl communicate with each other through a pipe 51 and the pressure regulator 53. The master cylinder 58 and the wheel cylinders WCfr and WCfl communicate with each other through a pipe 52 and the pressure regulator 53.

Here, a configuration of the pressure regulator 53 to supply the "wheel cylinder pressure" to one (WCfr) of the four wheel cylinders will be described. Since the same is true for other configurations, explanation thereof will be omitted. The pressure regulator 53 includes a holding valve 531, a decompression valve 532, a reservoir 533, a pump 534, and a motor 535. The holding valve 531 is a normally open type electromagnetic valve, and the opening and closing are controlled by the control unit 10. The holding valve 531 is provided such that one side is connected to a pipe 52 and the other side is connected to the wheel cylinder WCfr and the decompression valve 532. That is, the holding valve 531 is an input valve of the pressure regulator 53.

The decompression valve 532 is a normally closed type electromagnetic valve, and the opening and closing are controlled by the control unit 10. The decompression valve 532 is provided such that one side is connected to the wheel cylinder WCfr and the holding valve 531 and the other side is connected to the reservoir 533. When the decompression valve 532 is opened, the wheel cylinder WCfr and the reservoir 533 communicate with each other.

The reservoir 533 stores a brake fluid, and is connected to the pipe 52 through the decompression valve 532 and the pump 534. The pump 534 is provided such that a suction port is connected to the reservoir 533 and a discharge port is connected to the pipe 52 through a check valve z. The check valve z allows a flow from the pump 534 to the pipe 52, and regulates a flow in the opposite direction.

The pump 534 is driven by the operation of the motor 535 according to the command of the control unit 10. In a decompression mode of anti-lock brake control, the pump 534 absorbs a brake fluid in the wheel cylinder WCfr or a brake fluid stored in the reservoir 533 and returns the brake fluid to the master cylinder 58.

Thus, the pressure regulator 53 adjusts the "wheel cylinder pressure" regardless of the operation of the brake pedal 56, thereby being able to reduce the braking force of the brake units Bfl, Bfr, Brl, and Brr and generate the braking force in the brake units Bfl, Bfr, Brl, and Brr. The control unit 10 performs switching control of the opening and closing of the electromagnetic valves 531 and 532 based on the "master pressure", the wheel speed, and the longitudinal acceleration, and adjusts the "wheel cylinder pressure" given to the wheel cylinder WCfr by operating the motor 535 as necessary, thereby performing anti-lock brake control or antiskid control.

Clutch Operating Device

Figure 4:
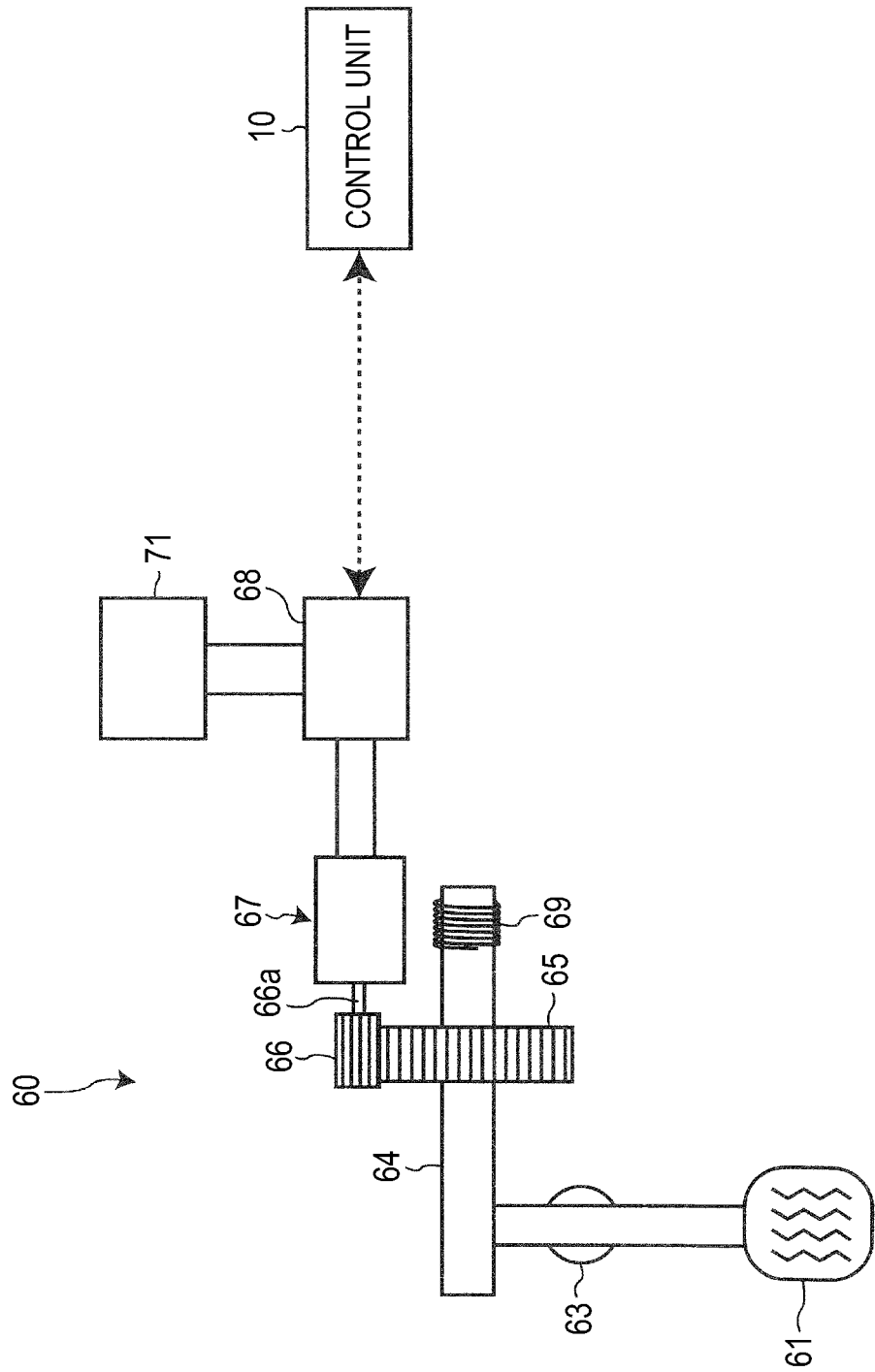
FIG. 4 is a diagram when viewed from A in FIG. 1, and is an explanatory diagram of a clutch operating device.

Hereinafter, a clutch operating device 60 will be described with reference to FIG. 4. The clutch operating device 60 is for operating the clutch 3. As shown in FIG. 4, the clutch operating device 60 includes the clutch pedal 61, the clutch sensor 62 (shown in FIG. 1), the master cylinder 63, a shaft 64, a driven gear 65, a drive gear 66, a motor 67, a clutch driver 68, a turnover spring 69, and a power storage unit 71.

The shaft 64 is rotatably fixed to the vehicle 100. The clutch pedal 61 is fixed to the shaft 64. By such a structure, the clutch pedal 61 is rotatably fixed to the vehicle 100. The driven gear 65 is fixed to the shaft 64. The drive gear 66 engages with the driven gear 65. In addition, the number of teeth of the driven gear 65 is larger than that of the drive gear 66, and the diameter of the driven gear 65 is larger than the diameter of the drive gear 66.

The motor 67 applies torque in the rotation direction of the clutch pedal 61 to the clutch pedal 61. The rotation direction includes both a direction, in which the clutch pedal 61 returns to the original position, and the opposite direction. The motor 67 includes both a DC motor and an AC motor.

The turnover spring 69 is biased in an opposite direction to a direction in which the clutch pedal 61 is stepped on, so that the clutch pedal 61 is returned to the original position before the clutch pedal 61 is stepped on. In the embodiment shown in FIG. 4, the turnover spring 69 is a wound spring which is wound around the shaft 64 and of which one end is fixed to the shaft 64 and the other end is fixed to the vehicle 100. There is no problem even if the turnover spring 69 is a coil spring.

The power storage unit 71 stores electrical power, and includes both a battery and a capacitor. There is no problem even if the power storage unit 71 is a battery that is originally installed in the vehicle 100. The clutch driver 68 is electrically connected to the motor 67 and the power storage unit 71. The clutch driver 68 is communicably connected to the control unit 10. The clutch driver 68 drives the motor 67 by converting the current supplied from the power storage unit 71 into the driving current supplied to the motor 67 based on the command from the control unit 10.

By the driving of the motor 67, the clutch stroke Cl can be arbitrarily controlled by swinging the clutch pedal 61 regardless of the operation of the clutch pedal 61 by the driver. Accordingly, it is possible to arbitrarily control the clutch torque Tc. A "clutch torque changing unit" to change the clutch torque Tc is formed by the driven gear 65, the drive gear 66, the motor 67, the clutch driver 68, and the power storage unit 71.

Collision Avoidance Process

Hereinafter, a "collision avoidance process" will be described with reference to the flowchart shown in FIG. 5. When the ignition is ON so that the vehicle 100 can travel, the "collision avoidance process" starts, and the program proceeds to step S11.

When the control unit 10 (collision possibility determination unit) determines that there is a possibility of collision in step S11 (S11: YES), the program proceeds to step S21. When it is determined that there is no possibility of collision in step S11 (S11: NO), the process of step S11 is repeated.

In step S21, the control unit 10 calculates a collision avoidance deceleration as. Specifically, the collision avoidance deceleration as is calculated based on the following Expression (1).

$$\alpha s=(-0.5\cdot((Vfwd/3.6)^2-(Vown/3.6)^2)/(d1-Lr+(Vown/3.6)\cdot tb))/g \quad (1)$$

αs: collision avoidance deceleration
Vfwd: obstacle speed
Vown: host vehicle speed
d1: distance to an obstacle in front that is a target at the time of stop (setting value)
Lr: distance to an obstacle in front
tb: idle time (setting value)

The control unit 10 calculates the obstacle speed Vfwd or the distance Lr to an obstacle in front based on the detection information from the obstacle detection device 15. The idle time tb is a time until steps S23, S42, and S52 that are control for avoiding collision, which will be described later, start from the current point in time. Since the method of calculating the collision avoidance deceleration as is disclosed in JP 11-321389A, further explanation thereof will be omitted. After step S21 ends, the program proceeds to step S22.

When the control unit 10 determines that collision can be avoided by reducing the clutch torque Tc in step S22 (S22: YES), the program proceeds to step S23. When the control unit 10 determines that collision cannot be avoided by reducing the clutch torque Tc in step S22 (S22: NO), the program proceeds to step S31. In addition, when the vehicle 100 does not reach the collision avoidance deceleration as even if the clutch torque Tc is set to 0, it is determined that collision cannot be avoided.

In step S23, the control unit 10 drives the motor 67 by outputting a control signal to the clutch driver 68, thereby reducing the clutch torque Tc so that the vehicle 100 reaches the collision avoidance deceleration as calculated in step S21. After step S23 ends, the program proceeds to step S61.

When the control unit 10 determines that there is a possibility of engine stall (stop of the engine 2) in step S31 (S31: YES), the program proceeds to step S32. When the control unit 10 determines that there is no possibility of engine stall in step S31 (S31: NO), the program proceeds to step S41. In addition, the control unit 10 determines that there is a possibility of engine stall when it is determined that the engine rotation speed Ne is lower than the specified rotation speed (for example, 700 r.p.m.).

In step S32, the control unit 10 disengages the clutch 3 by setting the clutch torque Tc to 0 by outputting the control signal to the clutch driver 68. After step S32 ends, the program proceeds to step S52.

When the control unit 10 determines that the clutch 3 is not completely engaged in step S41 (S41: YES), the program proceeds to step S42. When the control unit 10 determines that the clutch 3 is completely engaged in step S41 (S41: NO), the program proceeds to step S43. The state where the clutch 3 is not completely engaged is a state where the clutch torque Tc is not the maximum value, and refers to a state where the clutch 3 is a half-clutch state or a state where the clutch 3 is disengaged. This state where the clutch 3 is not completely engaged occurs when the process of step S23 is performed or when the driver steps on the clutch pedal 61.

In step S42, the control unit 10 completely engages the clutch 3 by maximizing the clutch torque Tc by outputting the control signal to the clutch driver 68. After step S42 ends, the program proceeds to step S43.

In step S43, the control unit 10 generates the so-called engine brake in the engine 2 by closing the throttle valve 22 and stopping the fuel injection in the fuel injection device 28 (fuel cut). After step S43 ends, the program proceeds to step S51.

When the control unit 10 determines that collision can be avoided by generating the engine brake in step S51 (S51: YES), the program proceeds to step S61. When the control unit 10 determines that collision cannot be avoided by generating the engine brake in step S51 (S51: NO), the program proceeds to step S52. In addition, when the vehicle 100 does not reach the collision avoidance deceleration as even if the engine brake is generated, it is determined that collision cannot be avoided.

In step S52, the control unit 10 generates a braking force in the brake units Bfl, Bfr, Brl, and Brr so that the vehicle 100 reaches the collision avoidance deceleration as by outputting a control signal to the pressure regulator 53 (shown in FIG. 3). After step S52 ends, the program proceeds to step S61.

In step S61, the notification device 16 sends a notification, which indicates the intervention of collision avoidance control, in response to the command from the control unit 10. After step S61 ends, the program proceeds to step S62.

When the control unit 10 determines that there is no possibility of collision in step S62 (S62: YES), the program proceeds to step S63. When the control unit 10 determines that there is a possibility of collision in step S62 (S62: NO), the program proceeds to step S21.

In step S63, the control unit 10 stops the process under execution among the processes of steps S23, S43, and S52. After step S63 ends, the program returns to step S11.

Collision Avoidance Process 1 When a Vehicle Travels

Hereinafter, a collision avoidance process when the vehicle 100 travels will be described with reference to the time chart shown in FIG. 6. When the relative distance between the vehicle 100 and the obstacle, such as a vehicle in front, is reduced ((1) in FIG. 6) and it is determined that there is a possibility of collision (determined to be YES in step S11 in FIG. 5) (T1 in FIG. 6), control to reduce the clutch torque Tc is started ((2) in FIG. 6, step S23 in FIG. 5). Then, the acceleration of the vehicle 100 by the engine torque Tc is suppressed or stopped, or the vehicle 100 is decelerated ((5) in FIG. 6).

Figure 5:
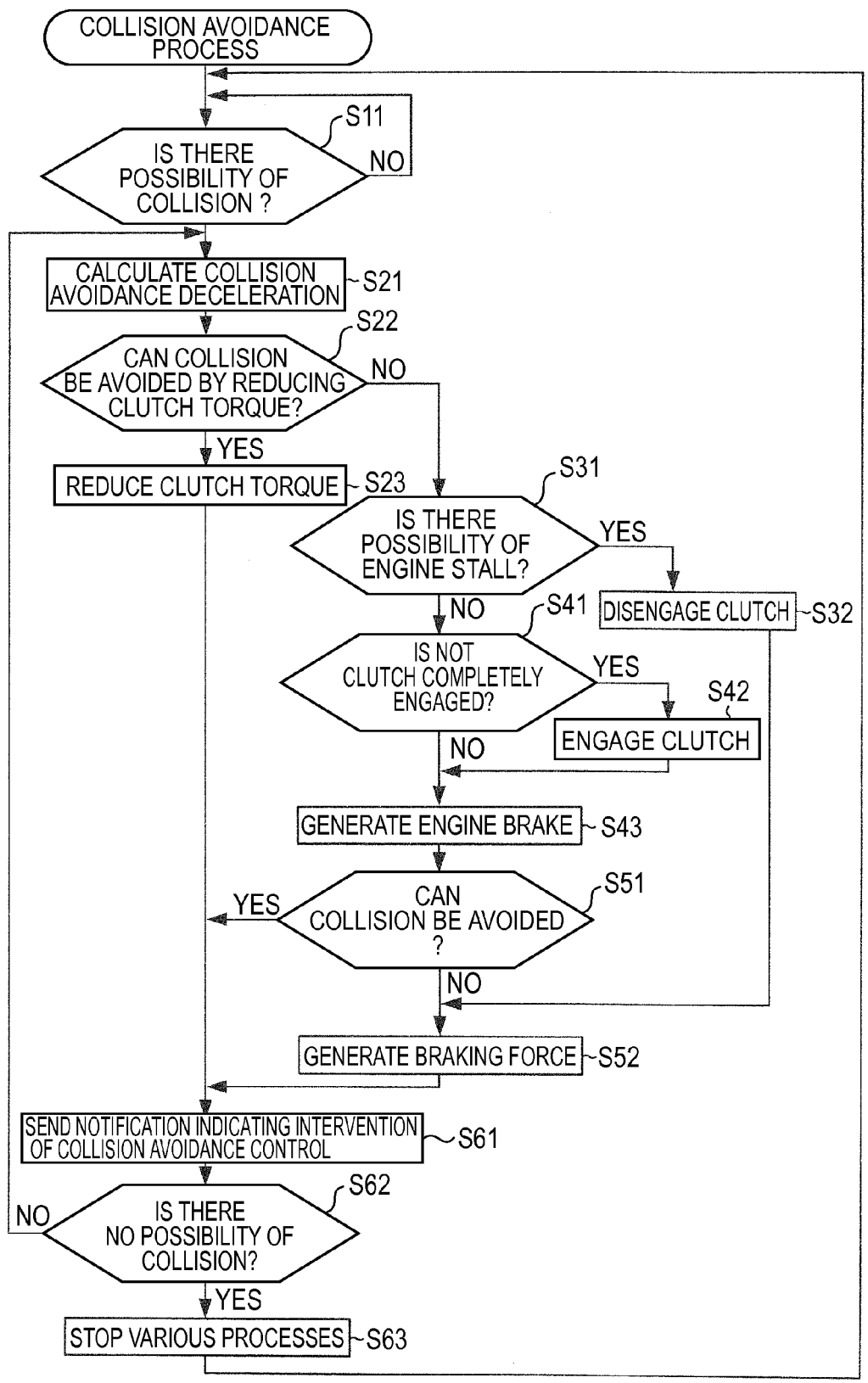
FIG. 5 is a flowchart of the "collision avoidance process"
Figure 6:
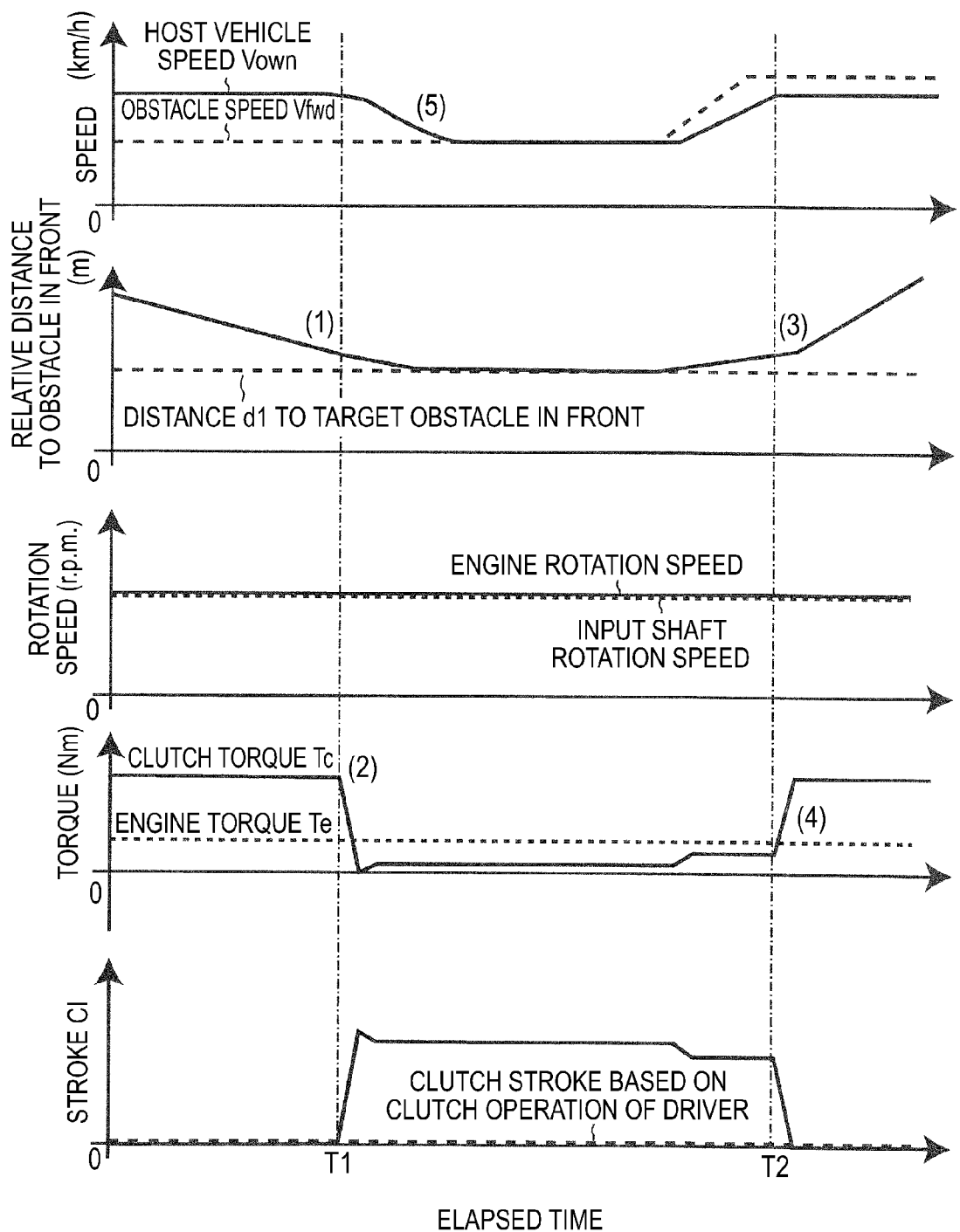
FIG. 6 is a time chart showing the relationship between the elapsed time and speed, relative speed with respect to an obstacle in front, rotation speed, torque, and a clutch stroke at the time of traveling of a vehicle.

During a period of T1 to T2 in FIG. 6, the clutch torque Tc is controlled such that the vehicle 100 reaches the collision avoidance deceleration as. When it is determined that there is no possibility of collision (T2 in FIG. 6, determined to be YES in step S62 in FIG. 5), for example, when the relative distance between the vehicle 100 and the obstacle, such as a vehicle in front, is increased ((3) in FIG. 6), control to reduce the clutch torque Tc is stopped ((4) in FIG. 6, step S63 in FIG. 5), and the clutch torque Tc becomes clutch torque based on the clutch pedal 61 stepped on by the driver.

Collision Avoidance Process 2 When a Vehicle Travels

Hereinafter, collision avoidance when the vehicle 100 travels will be described with reference to the time chart shown in FIG. 7. When the relative distance between the vehicle 100 and the obstacle, such as a vehicle in front, is reduced ((1) in FIG. 7) and it is determined that there is a possibility of collision (determined to be YES in step S11 in FIG. 5) and then it is determined that the collision cannot be avoided by reducing the clutch torque Tc (determined to be NO in step S22 in FIG. 5) (T1 in FIG. 7), engine brake is generated in a state where the clutch 3 is engaged ((2) in FIG. 7). Then, the vehicle 100 is decelerated ((6) in FIG. 7).

Figure 7:
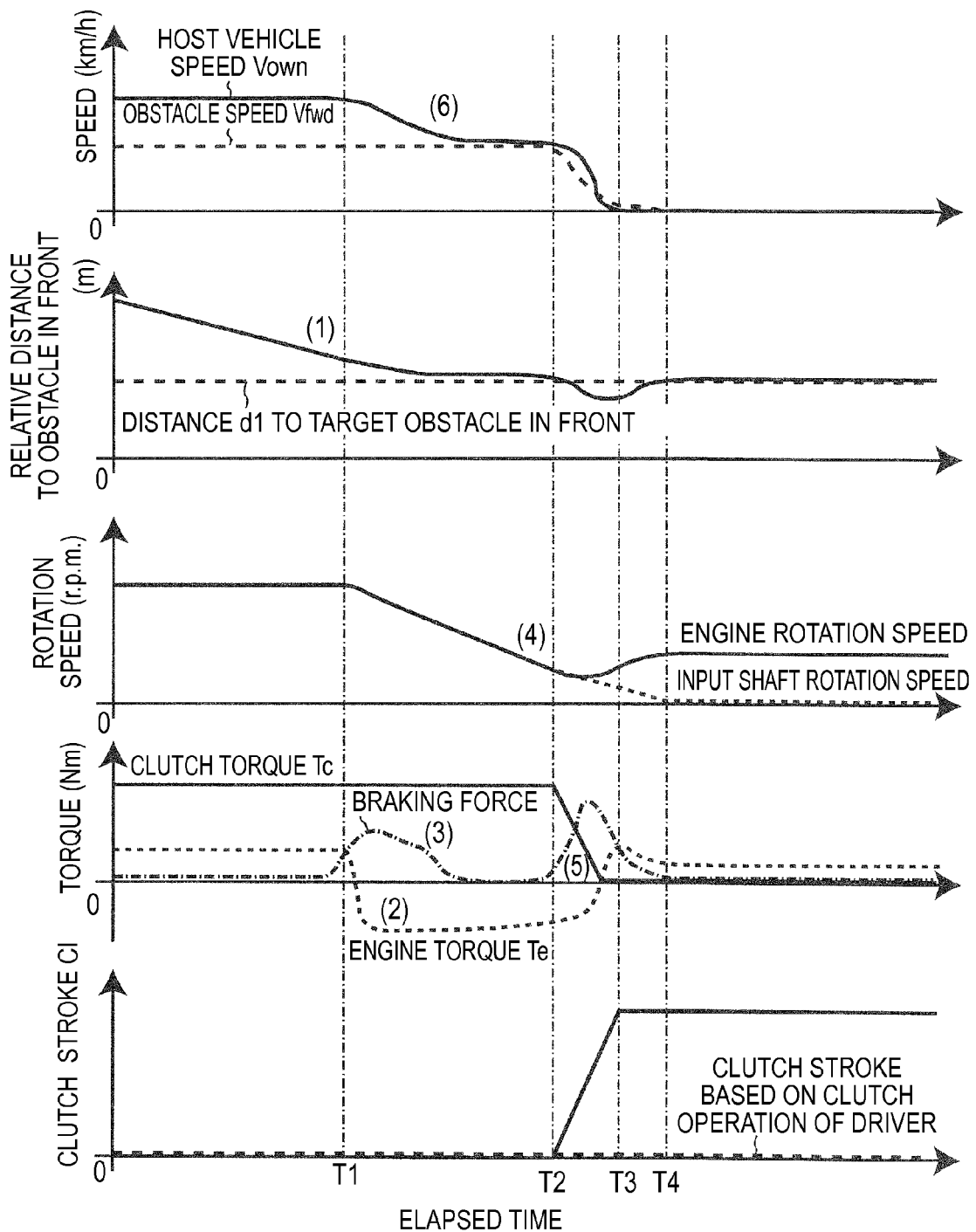
FIG. 7 is a time chart showing the relationship between the elapsed time and speed, relative speed with respect to an obstacle in front, rotation speed, torque, and a clutch stroke at the time of traveling of a vehicle.

When collision cannot be avoided just by generating the engine brake (determined to be NO in step S51 in FIG. 5), a braking force is generated ((3) in FIG. 7). When the engine rotation speed Ne is reduced ((4) in FIG. 7) and there is a possibility of engine stall (determined to be YES in step S31 in FIG. 5) (T2 in FIG. 7), the clutch 3 is disengaged ((5) and T3 in FIG. 7). Then, when the vehicle stops (T4 in FIG. 7) and there is no possibility of collision (determined to be YES in step S62 in FIG. 5), various processes for avoiding collision are stopped (step S63 in FIG. 5).

Collision Avoidance Process at the Start of Vehicle

Hereinafter, collision avoidance at the start of the vehicle 100 will be described with reference to the time chart shown in FIG. 8. When the driver releases the clutch pedal 61 to increase the clutch torque Tc ((1) and T1 in FIG. 8) and the vehicle 100 starts to move ((2) in FIG. 8), the relative distance between the vehicle 100 and the obstacle, such as a vehicle in front, is reduced ((3) in FIG. 8). When it is determined that there is a possibility of collision (T2 in FIG. 8, determined to be YES in step S11 in FIG. 5), control to reduce the clutch torque Tc is started ((4) in FIG. 8). Then, since the engine torque Te transmitted to driving wheels 18R and 18L is reduced or becomes 0, the vehicle 100 is decelerated ((5) in FIG. 8).

Figure 8:
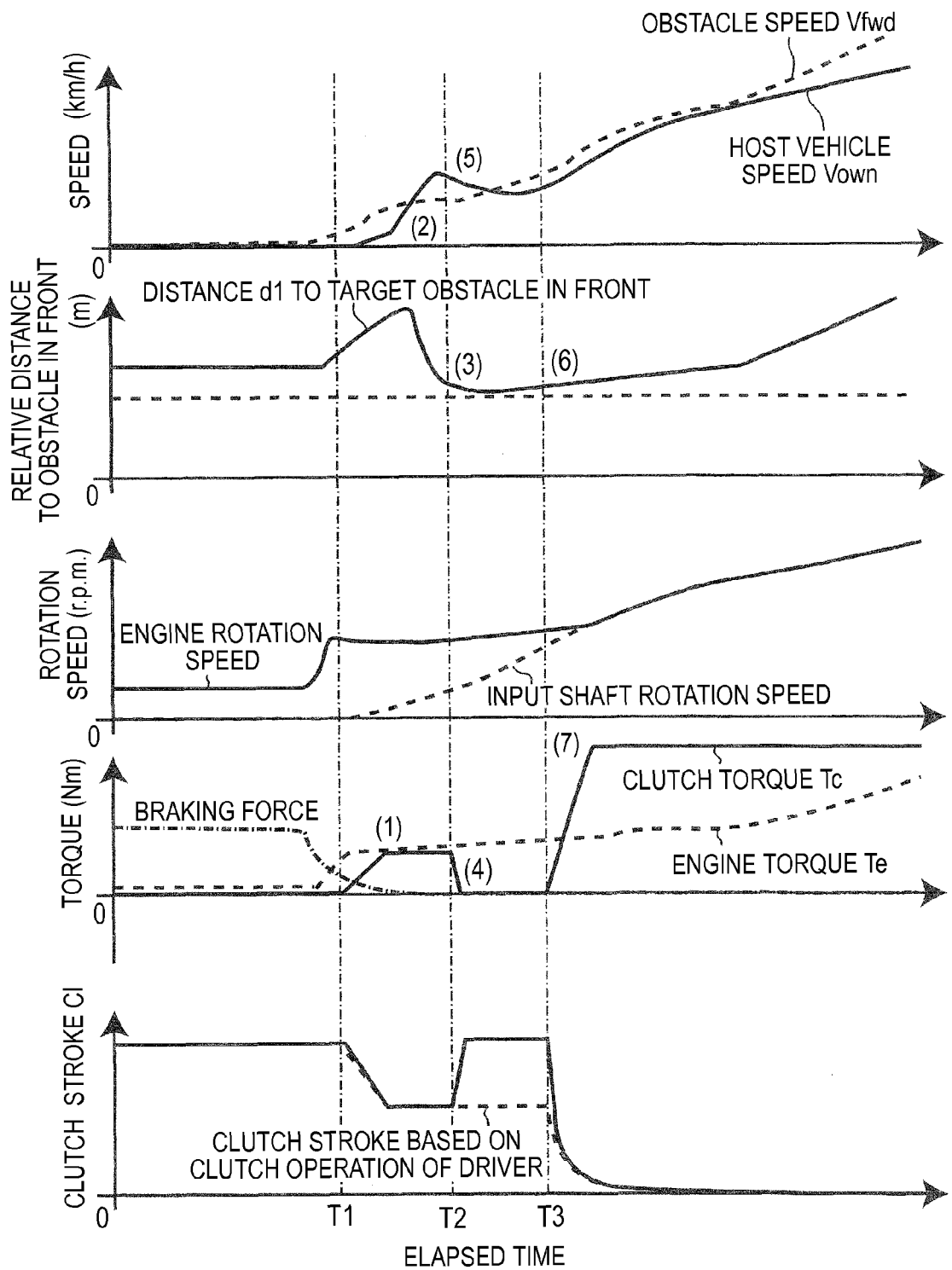
FIG. 8 is a time chart showing the relationship between the elapsed time and speed, relative speed with respect to an obstacle in front, rotation speed, torque, and a clutch stroke at the start of a vehicle.

Then, when there is no possibility of collision (T3 in FIG. 8, determined to be YES in step S62 in FIG. 5), for example, when the relative distance to the obstacle is increased ((6) in FIG. 8), control to reduce the clutch torque Tc is stopped ((7) in FIG. 8, step S63 in FIG. 5).

Effect of the Present Embodiment

As is apparent from the above explanation, when there is a possibility of collision with an obstacle (determined to be YES in step S11 in FIG. 5), the control unit 10 controls the motor 67 (clutch torque changing unit) to reduce the clutch torque Tc (S23 in FIG. 5, (2) in FIG. 6, (4) in FIG. 8). Then, the engine torque Te transmitted to the driving wheels 18R and 18L is reduced or becomes 0. As a result, the acceleration of the vehicle 100 by the engine torque Te is suppressed or stopped or the vehicle 100 is decelerated, thereby avoiding collision between the vehicle 100 and the obstacle in front.

When there is a possibility that the engine 2 will be stopped due to a reduction in the engine rotation speed Ne (determined to be YES in step S31 in FIG. 5), the control unit 10 controls the motor 67 (clutch torque changing unit) to disengage the clutch 3 (step S32 in FIG. 5, (5) in FIG. 7). Accordingly, the stop of power steering or the stop of the operation of the vacuum booster 59 (brake booster) due to the stop of the engine 2 is avoided. As a result, it is possible to decelerate or stop the vehicle 100 safely.

When there is a possibility of collision with an obstacle (determined to be YES in step S11 in FIG. 5), the control unit 10 performs a fuel cut in the engine 2 in a state where the clutch 3 is engaged (step S43 in FIG. 5, (2) in FIG. 7). Then, an engine brake acts on the vehicle 100 to decelerate the vehicle 100. As a result, it is possible to avoid collision between the vehicle 100 and the obstacle in front.

When generating the engine brake, the control unit 10 controls the motor 67 (clutch torque changing unit) to engage the clutch 3 when the clutch 3 is not completely engaged (determined to be YES in step S41 in FIG. 5). Accordingly, since an engine brake can be made to act on the vehicle 100 reliably, it is possible to reliably decelerate the vehicle 100.

When there is a possibility of collision with an obstacle (determined to be YES in step S11 in FIG. 5), the control unit 10 controls the pressure regulator 53 to generate a braking force in the brake units Bfl, Bfr, Brl, and Brr (braking force generation units) (step S52 in FIG. 5, (3) in FIG. 7). Thus, it is possible to decelerate or stop the vehicle 100 reliably by the generation of braking force.

The motor 67 drives the clutch pedal 61 to variably control the clutch torque Tc. In this case, it is not necessary to provide a special hydraulic circuit or a mechanism or the like for making the clutch disc 32 close to or away from the flywheel 31 or the pressure plate 35. Therefore, it is possible to variably control the clutch torque Tc with a simple structure.

The notification device 16 (notification unit) notifies the driver of the intervention of collision avoidance control (operation of the clutch torque changing unit) (S61 in FIG. 5). In this manner, by notifying the driver of the intervention of collision avoidance control, the driver can perceive that there is a possibility of collision. As a result, it is possible to call the attention of the driver. Since the driver perceives the intervention of collision avoidance control, it is possible to reduce the discomfort of the driver due to a change in the behavior of the vehicle 100 according to the intervention of the collision avoidance control.

Other Embodiments

Hereinafter, different embodiments from the above embodiment will be described.

In the embodiment described above, a rotary shaft 67a of the motor 67 is rotatably connected to the shaft 64 through the drive gear 66 and the driven gear 65. However, the rotary shaft 67a of the motor 67 may be directly connected to the shaft 64. In the present embodiment, since torque output from the motor 67 is increased and transmitted to the shaft 64 by the drive gear 66 and the driven gear 65, it is possible to use a small motor 67. Alternatively, the torque output from the motor 67 may be directly applied to the clutch pedal 61.

In the embodiment described above, since the motor 67 rotates the clutch pedal 61, the clutch torque Tc is variably controlled. However, the mechanism (clutch torque changing unit) that controls the clutch torque Tc by rotation is not limited to this. For example, a hydraulic circuit for increasing or decreasing the hydraulic pressure generated by the master cylinder 63 or a mechanism for making the clutch disc 32 close to or away from the flywheel 31 or the pressure plate 35 with an actuator may be used.

In the embodiment described above, the operation force of the clutch pedal 61 is transmitted to the release bearing 37 through the master cylinder 63, the hydraulic pressure pipe 39, and the slave cylinder 38. However, the operation force of the clutch pedal 61 may be transmitted to the release bearing 37 through a mechanical element, such as a wire, a rod, or a gear.

In the embodiment described above, the clutch sensor 62 detects a stroke amount of the master cylinder 63. However, the clutch sensor 62 may be a sensor that detects the operation amount of the clutch pedal 61, the master pressure of the master cylinder 63, the stroke or hydraulic pressure of the slave cylinder 38, or the stroke amount of the release bearing 37.

In the embodiment described above, the control unit 10 calculates the host vehicle speed Vown based on the output shaft rotation speed No detected by the output shaft rotation speed sensor 46. However, the control unit 10 may calculate the host vehicle speed Vown based on the wheel rotation speed detected by a wheel speed sensor, which detects the rotation speed of the wheel, or a sensor that detects the rotation speed of the shaft rotating in conjunction with other wheels.

In the embodiment described above, the clutch pedal 61 is a clutch operation member for transmitting the operation force of the driver to the clutch 3. However, the clutch operation member is not limited to the clutch pedal 61. For example, a clutch lever may be used. Similarly, instead of the accelerator pedal 81 for adjusting the accelerator opening Ac, it is possible to use an accelerator grip for adjusting the accelerator opening Ac, for example. In addition, it is needless to say that the technical idea disclosed here can be applied even if the vehicle driving device of the present embodiment is applied to motorcycles or other vehicles.

In the embodiment described above, the single control unit 10 performs the "collision avoidance process" shown in FIG. 5 while controlling the engine 2. However, an engine control unit may control the engine 2, and the control unit 10 that is connected to the engine control unit through communication means, such as a controller area network (CAN), may perform the "collision avoidance process".

A first aspect of this disclosure is directed to a vehicle driving device including: a clutch that is provided between a driving shaft of an engine and an input shaft of a manual transmission and that connects the driving shaft and the input shaft to each other or disconnects the driving shaft and the input shaft from each other; a clutch torque changing unit that changes clutch torque between the driving shaft and the input shaft; a collision possibility determination unit that determines a possibility of collision between an obstacle and a host vehicle; and a collision avoidance unit that gives an instruction to the clutch torque changing unit so as to avoid collision with the obstacle when the collision possibility determination unit determines that there is a possibility of collision with the obstacle.

A second aspect of this disclosure is directed to the vehicle driving device according to the first aspect of this disclosure, wherein, when the collision possibility determination unit determines that there is a possibility of collision with the obstacle, the collision avoidance unit instructs the clutch torque changing unit to reduce the clutch torque from a current value.

A third aspect of this disclosure is directed to the vehicle driving device according to the second aspect of this disclosure, wherein, when the collision avoidance unit determines that collision is not avoidable just by reducing the clutch torque, the collision avoidance unit instructs the engine to generate an engine brake in a state where the clutch is engaged.

A fourth aspect of this disclosure is directed to the vehicle driving device according to any one of the first to third aspects of this disclosure, wherein, when there is a possibility that the engine will be stopped due to a reduction in a rotation speed of the engine, the collision avoidance unit controls the clutch torque changing unit to disengage the clutch.

A fifth aspect of this disclosure is directed to the vehicle driving device according to any one of the first to fourth aspects of this disclosure, wherein, when the collision possibility determination unit determines that there is a possibility of collision with the obstacle, the collision avoidance unit performs a fuel cut in the engine in a state where the clutch is engaged.

A sixth aspect of this disclosure is directed to the vehicle driving device according to any one of the first to fifth aspects of this disclosure, wherein the clutch is engaged by the clutch torque changing unit.

A seventh aspect of this disclosure is directed to the vehicle driving device according to any one of the first to sixth aspects of this disclosure, wherein the vehicle driving device further includes a braking force generation unit that generates a braking force, and the collision avoidance unit causes the braking force generation unit to generate a braking force when the collision possibility determination unit determines that there is a possibility of collision with the obstacle.

An eighth aspect of this disclosure is directed to the vehicle driving device according to any one of the first to seventh aspects of this disclosure, wherein the vehicle driving device further includes a clutch operation unit that operates the clutch, and the clutch torque changing unit drives the clutch operation unit in a direction in which the clutch is disengaged.

A ninth aspect of this disclosure is directed to the vehicle driving device according to any one of the first to eighth aspects of this disclosure, wherein the vehicle driving device further includes a notification unit that notifies a driver of an operation of the clutch torque changing unit.

According to the first aspect of this disclosure, when there is a possibility of collision with the obstacle, the collision avoidance unit controls the clutch torque changing unit. In this case, for example, the clutch torque changing unit reduces the clutch torque, so that the engine torque transmitted to the driving wheels is reduced or becomes 0. Accordingly, the acceleration of the vehicle by the engine torque is suppressed or stopped or the vehicle is decelerated, thereby avoiding collision between the vehicle and the obstacle in front.

According to the second aspect of this disclosure, the collision avoidance unit controls the clutch torque changing unit to reduce the clutch torque. In this case, the engine torque transmitted to the driving wheels is reduced or becomes 0. Accordingly, the acceleration of the vehicle by the engine torque is suppressed or stopped or the vehicle is decelerated, thereby avoiding collision between the vehicle and the obstacle in front.

According to the third aspect of this disclosure, engine brake is generated in a state where the clutch is engaged, and thus the vehicle can be decelerated.

According to the fourth aspect of this disclosure, when there is a possibility that the engine will be stopped due to a reduction in the rotation speed of the engine, the collision avoidance unit controls the clutch torque changing unit to disengage the clutch. Accordingly, the assistance stop of the operation force (steering assisting force) of power steering or the stop of the brake booster due to the stop of the engine is avoided. As a result, it is possible to decelerate or stop the vehicle safely.

According to the fifth aspect of this disclosure, when there is a possibility of collision with the obstacle, a collision avoidance unit performs a fuel cut in the engine in a state where the clutch is engaged. In this case, an engine brake acts on the vehicle to decelerate the vehicle. As a result, it is possible to avoid collision between the vehicle and the obstacle in front.

According to the sixth aspect of this disclosure, the collision avoidance unit causes the clutch torque changing unit to engage the clutch. In this case, it is possible to make an engine brake act on the vehicle reliably.

According to the seventh aspect of this disclosure, when there is a possibility of collision with the obstacle, the collision avoidance unit causes the braking force generation unit to generate a braking force. Thus, it is possible to decelerate or stop the vehicle reliably by the generation of braking force.

According to the eighth aspect of this disclosure, the clutch torque changing unit drives the clutch operation unit that operates the clutch in a direction in which the clutch is disengaged. In this case, it is possible to control the clutch torque variably with a simple structure.

According to the ninth aspect of this disclosure, the notification unit notifies a driver of the operation of the clutch torque changing unit. In this case, by notifying the driver of the operation of the clutch torque changing unit, the driver can perceive that there is a possibility of collision. As a result, it is possible to call the attention of the driver. In addition, since the driver perceives the operation of the clutch torque changing unit, it is possible to reduce the discomfort of the driver due to a change in the behavior of the vehicle according to the operation of the clutch torque changing unit.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A vehicle driving device comprising:
a clutch that is provided between a driving shaft of an engine and an input shaft of a manual transmission and that connects the driving shaft and the input shaft to each other or disconnects the driving shaft and the input shaft from each other;
a clutch torque changing unit that changes clutch torque between the driving shaft and the input shaft;
a collision possibility determination unit that determines a possibility of collision between an obstacle and a host vehicle;
a collision avoidance unit that gives an instruction to the clutch torque changing unit so as to avoid collision with the obstacle when the collision possibility determination unit determines that there is a possibility of collision with the obstacle;
wherein, when the collision possibility determination unit determines that there is a possibility of collision with the obstacle, the collision avoidance unit instructs the clutch torque changing unit to reduce the clutch torque from a current value; and
wherein, when the collision avoidance unit determines that collision is not avoidable just by reducing the clutch torque, the collision avoidance unit instructs the engine to generate an engine brake in a state where the clutch is engaged.

2. The vehicle driving device according to claim 1, wherein, when there is a possibility that the engine will be stopped due to a reduction in a rotation speed of the engine, the collision avoidance unit controls the clutch torque changing unit to disengage the clutch.

3. The vehicle driving device according to claim 1, wherein, when the collision possibility determination unit determines that there is a possibility of collision with the obstacle, the collision avoidance unit performs a fuel cut in the engine in a state where the clutch is engaged.

4. The vehicle driving device according to claim 2, wherein the clutch is engaged by the clutch torque changing unit.

5. The vehicle driving device according to claim 1, further comprising:
a braking force generation unit that generates a braking force,
wherein the collision avoidance unit causes the braking force generation unit to generate a braking force when the collision possibility determination unit determines that there is a possibility of collision with the obstacle.

6. The vehicle driving device according to claim 1, further comprising:
a clutch operation unit that operates the clutch,
wherein the clutch torque changing unit drives the clutch operation unit in a direction in which the clutch is disengaged.

7. The vehicle driving device according to claim 1, further comprising:
a notification unit that notifies a driver of an operation of the clutch torque changing unit.

* * * * *